(12) United States Patent
Bin et al.

(10) Patent No.: US 12,227,080 B2
(45) Date of Patent: Feb. 18, 2025

(54) MOTOR DRIVING SYSTEM AND METHOD OF CONTROLLING SAME

(71) Applicants: Hyundai Motor Company, Seoul (KR); Kia Corporation, Seoul (KR)

(72) Inventors: Seung Hyeon Bin, Hwaseong-Si (KR); Byung Oh Tak, Hwaseong-Si (KR); Seon Mi Lee, Anyang-Si (KR); Sang Woo Park, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 17/869,658

(22) Filed: Jul. 20, 2022

(65) Prior Publication Data
US 2023/0150373 A1    May 18, 2023

(30) Foreign Application Priority Data
Nov. 18, 2021    (KR) .................. 10-2021-0159435

(51) Int. Cl.
| | |
|---|---|
| H02P 6/10 | (2006.01) |
| B60L 15/20 | (2006.01) |
| H02P 21/05 | (2006.01) |
| H02P 25/16 | (2006.01) |
| H02P 25/18 | (2006.01) |
| H02P 25/22 | (2006.01) |
| H02P 27/06 | (2006.01) |

(52) U.S. Cl.
CPC .............. *B60L 15/20* (2013.01); *H02P 25/18* (2013.01); *H02P 25/22* (2013.01); *H02P 27/06* (2013.01); *B60L 2240/427* (2013.01)

(58) Field of Classification Search
CPC ........ H02P 27/06; H02P 29/024; H02P 25/22; H02P 25/18; H02P 21/05; H02P 25/16; H02P 6/10; B60L 15/20; B60L 2240/427
USPC ........................................................ 318/495
See application file for complete search history.

(56) References Cited

U.S. PATENT DOCUMENTS

| | | | |
|---|---|---|---|
| 8,183,820 B2 | 5/2012 | Anwar et al. | |
| 10,581,361 B2 | 3/2020 | Chen et al. | |
| 2007/0241699 A1* | 10/2007 | Osada .................. | H02P 5/74 318/141 |
| 2011/0181219 A1 | 7/2011 | Liegeois et al. | |
| 2015/0061567 A1* | 3/2015 | Gorka .................. | H02P 25/22 323/282 |
| 2016/0023572 A1* | 1/2016 | Reuss .................. | H02P 6/14 318/400.27 |
| 2021/0384863 A1* | 12/2021 | Omata ................. | H02P 25/22 |

FOREIGN PATENT DOCUMENTS

| | | |
|---|---|---|
| JP | 2009-273348 | 11/2009 |
| JP | 2013-066326 | 4/2013 |
| JP | 2019-198152 | 11/2019 |
| JP | 2020-058176 | 4/2020 |

(Continued)

*Primary Examiner* — Gabriel Agared
(74) *Attorney, Agent, or Firm* — Morgan, Lewis & Bockius LLP (57) ABSTRACT

A motor driving system and a method of controlling same can protect a user by converting a driving mode into a dual inverter driving mode so that a vehicle can keep being driven when a transfer switching unit breaks down while the motor is operated in a Y-connection single inverter driving mode.

17 Claims, 5 Drawing Sheets

(56) References Cited

FOREIGN PATENT DOCUMENTS

| JP | 2020-124018 | 8/2020 |
| KR | 10-2021-0027673 | 3/2021 |
| KR | 10-2021-0122343 | 10/2021 |
| KR | 10-2023-0119438 | 8/2023 |

* cited by examiner

MOTOR DRIVING SYSTEM AND METHOD OF CONTROLLING SAME

CROSS REFERENCE TO RELATED APPLICATION

The present application claims priority to Korean Patent Application No. 10-2021-0159435, filed Nov. 18, 2021, the entire contents of which is incorporated herein for all purposes by this reference.

BACKGROUND OF THE PRESENT DISCLOSURE

Field of the Present Disclosure

The present disclosure relates to a motor driving system and a method of controlling same, more particularly, to a motor driving system that changes a driving mode into an open-end winding dual inverter driving mode when a transfer switching unit breaks while the motor is driven in a Y-connection single inverter driving mode, and a method of controlling same.

Description of Related Art

In general, windings each corresponding to a phase included in a motor are connected to one inverter at an end and connected to each other at the other end portion, forming Y-connection. When the motor is driven, a switching device in the inverter applies a line voltage to the Y-connected windings of the motor and generates an AC current while being turned ON/OFF by pulse width modulation control, generating torque.

Because an electric vehicle, etc. that use torque generated by a motor as power depend on the inverter-motor power conversion efficiency, it is important to maximize the power conversion efficiency of an inverter and the efficiency of a motor to improve fuel efficiency.

Accordingly, there is a demand for a motor driving technology that can cover all of low-output and high-output periods with one motor and can improve efficiency of a system in the present field.

To the present end, it is possible to apply a technology that can improve inverter efficiency for driving a motor by converting a driving mode into a Y-connection motor driving mode and an open-end winding motor driving mode in accordance with required output of the motor using a transfer switch. In more detail, when a motor is driven in a Y-connection motor driving mode, the motor is driven by a single inverter, and when the motor is driven in an open-end winding motor driving mode, the motor is driven by a dual inverter.

In the instant case, a breakage reaction may occur in a transfer switch while a vehicle is driven in the Y-connection motor driving mode that utilizes a single inverter. However, when the motor is driven by a single inverter even though the transfer switch breaks, regenerative torque may be generated by an overcurrent in the transfer switch. This may cause inconvenience to a user by interrupting continuous driving of a vehicle, and increases the possibility of an accident by suddenly decelerating when a vehicle is driven at a high speed.

Accordingly, there is a demand for a specific vehicle control strategy that can protect a user when a transfer switch breaks while a vehicle is driven in the Y-connection motor driving mode that utilizes a single inverter.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving system that changes a driving mode into an open-end winding dual inverter driving mode when a transfer switching unit breaks while the motor is driven in a Y-connection single inverter driving mode, and a method of controlling same.

To achieve the objectives of the present disclosure, a motor driving system includes: a first inverter including a plurality of switching devices and connected to first ends of windings of the motor; a second inverter including a plurality of switching devices and connected to second ends of the windings of the motor; a transfer switching unit including a plurality of switching devices of which first ends are connected to the windings of the motor, respectively, and of which second ends are connected to each other between the first inverter and the second inverter; and a controller configured to operate the motor in a single inverter driving mode that utilizes only the first inverter and a dual inverter driving mode that utilizes both the first inverter and the second inverter by controlling the transfer switching unit, and configured to turn off the transfer switching unit and drive the second inverter to convert a driving mode of the motor into the dual inverter driving mode when the transfer switching unit breaks while a vehicle is driven in the single inverter driving mode.

The controller may set torque limitation ranges as ranges of controllable torque, may apply different torque limitation ranges to the driving modes, and may maintain a torque limitation range of the single inverter driving mode when converting the single inverter driving mode into the dual inverter driving mode due to breakdown of the transfer switching unit.

Furthermore, controller may diagnose also breakdown of the first inverter and the second inverter, and may convert a driving mode of the motor into the dual inverter driving mode when the transfer switching unit breaks even though the first inverter and the second inverter are normal.

The controller may output an inverter check request message on an AVN when the transfer switching unit breaks.

The controller may operate the motor in a Y-connection type by turning on the transfer switching unit in the single inverter driving mode, and may operate the motor in open-end winding by turning off the transfer switching unit in the dual inverter driving mode.

The controller may forcibly turn off the transfer switching unit when even any one of the switching devices of the transfer switching unit breaks. The controller may convert the driving mode of the motor into the dual inverter driving mode without turning off the transfer switching unit when all of the switching devices of the transfer switching unit are off due to breakdown of the transfer switching unit.

The switching devices of the transfer switching unit may be mechanical relays.

To achieve the objectives of the present disclosure, a method of controlling a motor driving system, which includes a first inverter, a second inverter, and a transfer switching unit and operates the motor into a single inverter driving mode that utilizes only the first inverter or into a dual inverter driving mode that utilizes both the first inverter and the second inverter, includes: determining whether a vehicle is driven in the single inverter driving mode by a controller; diagnosing breakdown of the transfer switching unit by the controller; turning off the transfer switching unit by the controller when the transfer switching unit breaks; and converting into the dual inverter driving mode by the controller when the transfer switching unit is off.

The method may further include setting torque limitation ranges as ranges of controllable torque, and applying different torque limitation ranges to the driving modes by the controller.

The controller may maintain a torque limitation range of the single inverter driving mode when converting the single inverter driving mode into the dual inverter driving mode due to breakdown of the transfer switching unit in the applying of the torque limitation ranges.

The controller may diagnose also breakdown of the first inverter and the second inverter in the diagnosing of breakdown of the transfer switching unit, and may convert the driving mode of the motor into the dual inverter driving mode when all of the inverters are normal and the transfer switching unit breaks.

The method may further include displaying an inverter check request message on an AVN by the controller when the transfer switching unit breaks The controller may forcibly turn off the transfer switching unit when even any one of the switching devices of the transfer switching unit breaks in the turning off of the transfer switching unit.

According to an exemplary embodiment of the present disclosure, when a transfer switching unit while a motor is operated in a Y-connection single inverter driving mode, the driving mode is converted into a dual inverter driving mode so that a vehicle can keep being driven, whereby it is possible to protect a user.

Furthermore, the same torque limit range is applied before/after the mode is changed when breakdown occurs, whereby it is possible to prevent a rapid change of a driving situation.

Furthermore, when breakdown occurs, an alert message for checking inverters is displayed through an AVN, etc., whereby it is possible to induce a user to rapidly take measures.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 1:
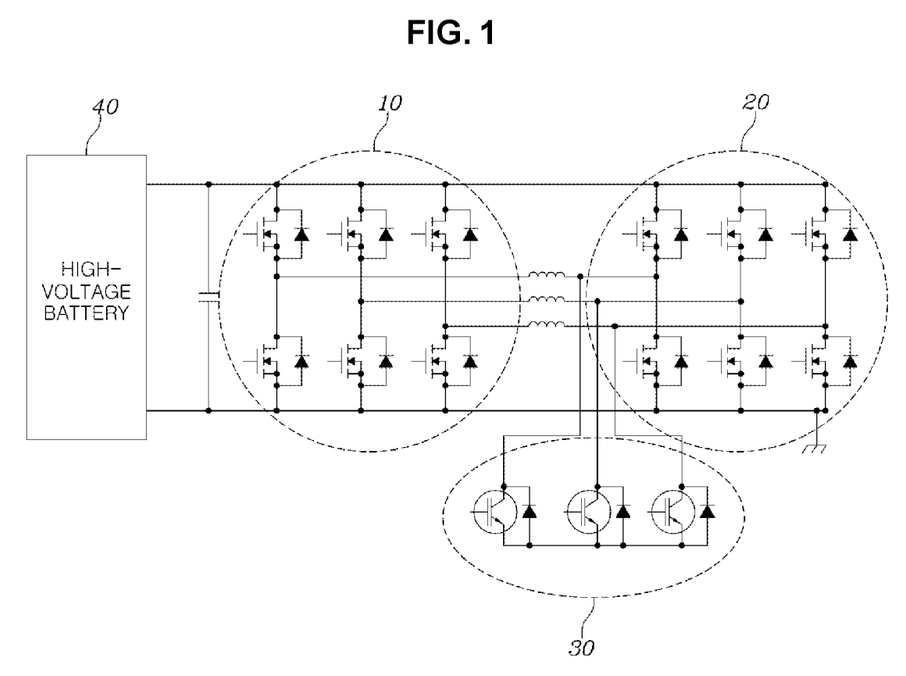
FIG. 1 is a circuit diagram of a motor driving system according to various exemplary embodiments of the present disclosure.
Figure 2:
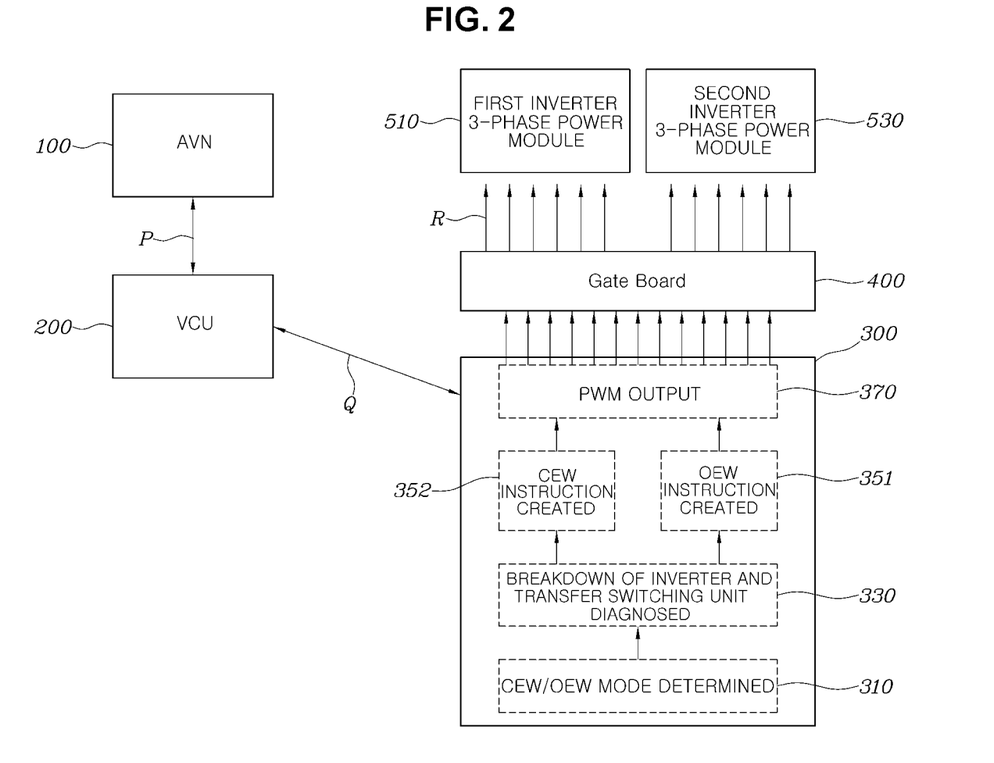
FIG. 2 is a conceptual diagram of control by the motor driving system shown in FIG. 1.
Figure 3:
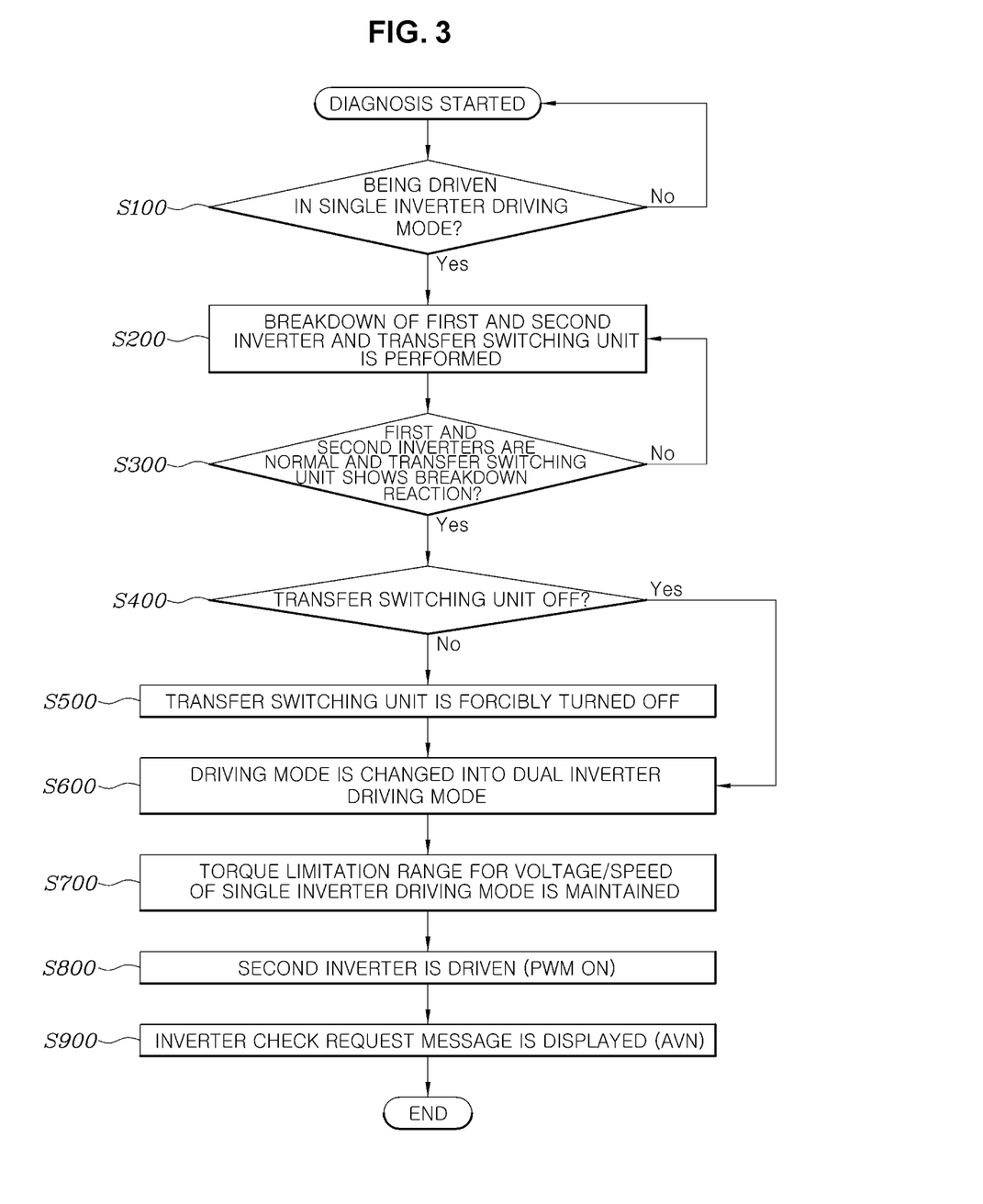
FIG. 3 is a flowchart of a method of controlling a motor driving system according to various exemplary embodiments of the present disclosure.
Figure 4:
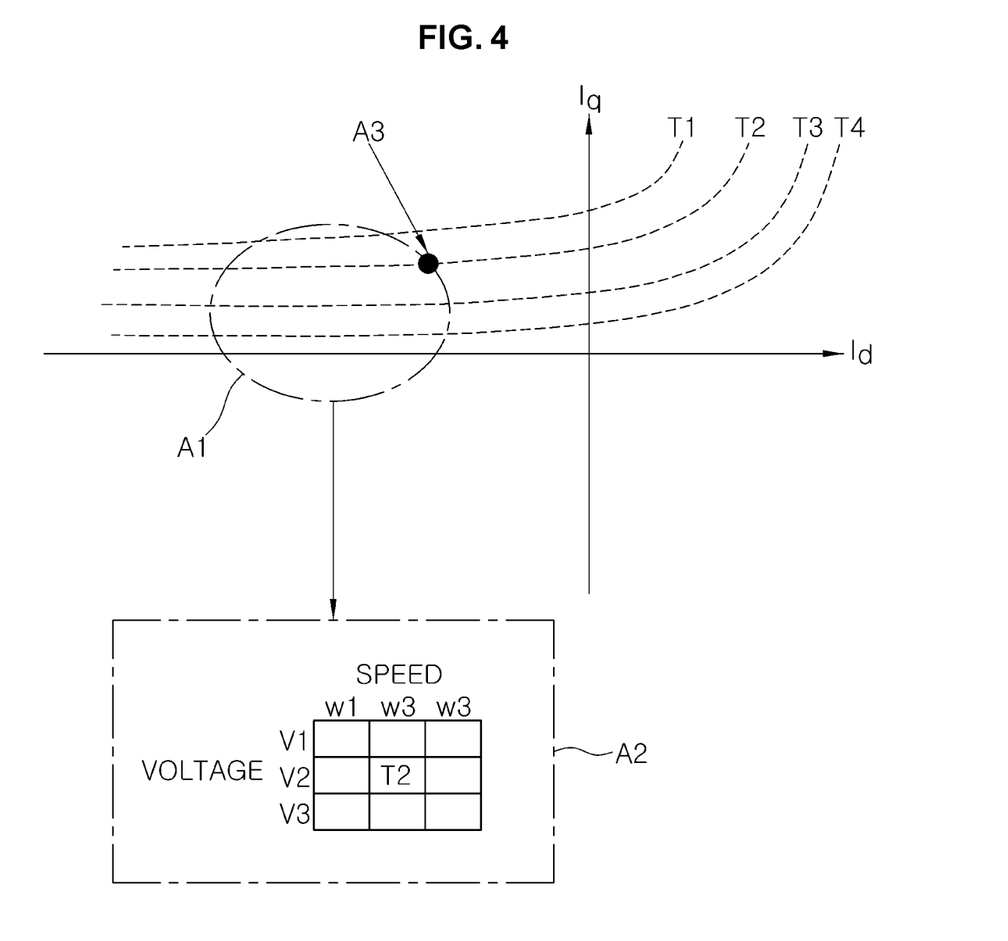
FIG. 4 is a graph and table showing a torque limitation range in a dual inverter driving mode according to various exemplary embodiments of the present disclosure.
Figure 5:
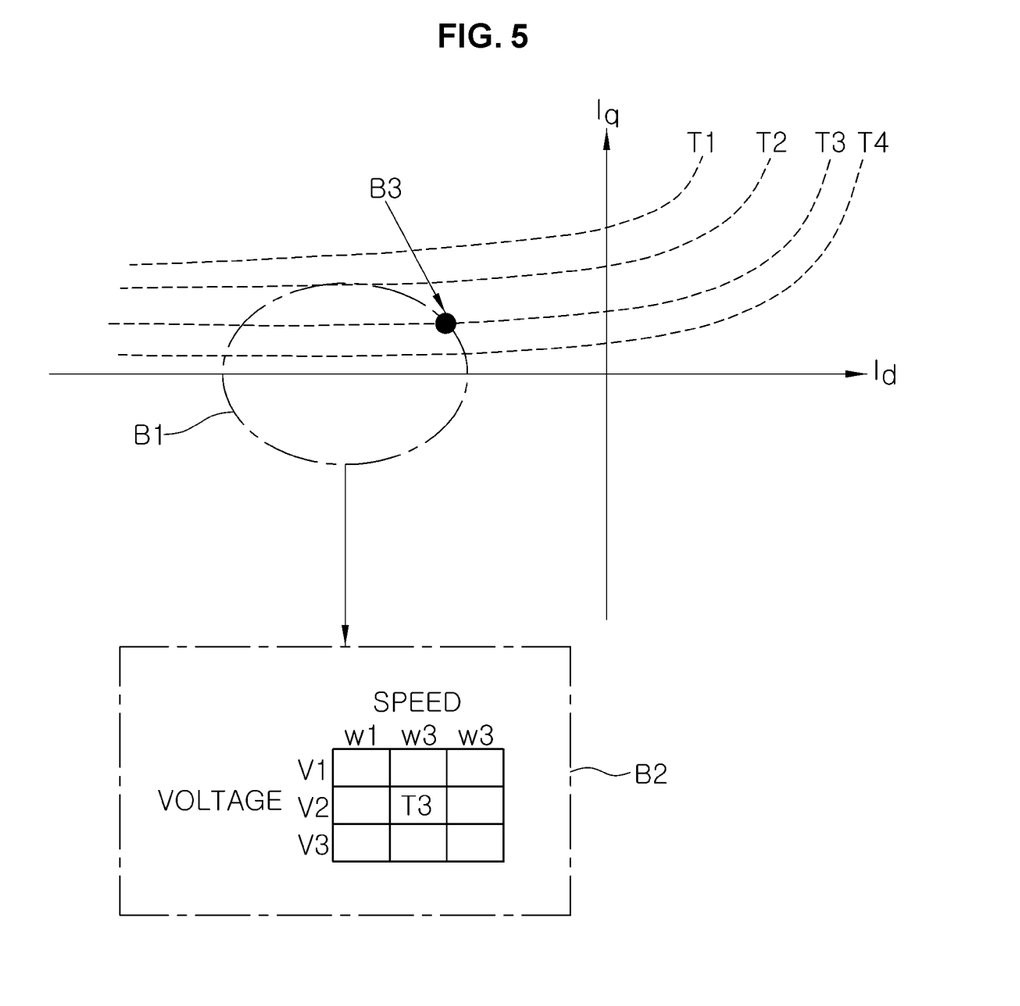
FIG. 5 is a graph and table showing a torque limitation range in a single inverter driving mode according to various exemplary embodiments of the present disclosure.

FIG. 1 is a circuit diagram according to various exemplary embodiments of the present disclosure and FIG. 2 is a conceptual diagram of control by a motor driving system of the present disclosure. FIG. 3 is a flowchart of a method of controlling a motor driving system of the present disclosure. FIG. 4 is a graph and table showing a torque limitation range in a dual inverter driving mode according to various exemplary embodiments of the present disclosure and FIG. 5 is a graph and table showing a torque limitation range in a single inverter driving mode according to various exemplary embodiments of the present disclosure.

FIG. 1 is a circuit diagram according to various exemplary embodiments of the present disclosure and shows a circuit that can change a driving mode into a single inverter driving mode or a dual inverter driving mode through a transfer switching unit 30.

Referring to FIG. 1, a motor driving system according to various exemplary embodiments of the present disclosure, which is a motor driving system that supplies driving power to a motor including a plurality of windings corresponding to a plurality of phases, may include: a first inverter 10 including a plurality of switching devices and connected to first ends of the windings of the motor; a second inverter 20 including a plurality of switching devices and connected to second ends of the windings of the motor; a transfer switching unit 30 including a plurality of switching devices of which first ends are connected to the windings of the motor, respectively, and of which second ends are connected to each other between the first inverter 10 and the second inverter 20; and a controller 300 controlling ON/OFF of the switching devices of the first inverter 10, the second inverter 20, and the transfer switching unit 30.

The first inverter 10 and the second inverter 20 can convert the DC power stored in a battery 40 into 3-phase AC power and provide the 3-phase AC power to the motor or can convert regenerative braking energy, which is generated by regenerative braking torque which is generated by the motor in regenerative braking, into AC and provide the AC to the battery 40. Conversion between DC power and AC power may be performed by pulse width modulation (PWM) of the switching devices of the first inverter 10 and the second inverter.

The first inverter 10 is connected to the first ends of the windings of the motor and the second inverter 20 is connected to the second ends of the windings of the motor. That is, open-end winding type electrical connection in which both ends of the windings of the motor are connected to the first inverter 10 and the second inverter 20, respectively, may be configured.

The transfer switching unit 30 includes a plurality of switching devices of which first ends are connected to the windings of the motor, respectively, between the first inverter 10 and the second inverter 20, and of which second ends are connected to each other. As an exemplary embodiment of the present disclosure, the transfer switching unit 30 may include three switching devices, in which first ends of the switching devices may by connected to nodes formed between the second inverter 20 and the first ends of the windings corresponding to the phases of the motor, respectively, and the second ends of the switching devices may be connected to each other.

Various switching portions well-known in the art such as MOSFET, IGBT, a thyristor, and a relay may be used as the switching devices of the transfer switching unit 30.

In the present circuit diagram, when the transfer switching unit 30 is turned off, the motor is driven in a dual inverter driving mode in which the motor is connected in an open-end winding type and both the first inverter 10 and the second inverter 20 are driven. On the other hand, when the transfer switching unit 30 is turned on, the motor is driven in a single inverter driving mode in which the motor is connected in Y-connection type and only the first inverter 10 is driven.

In more detail, when the power required for the motor is smaller than a predetermined reference value, the controller 300 can drive the motor by performing PWM control on the switching devices of the first inverter 10 without operating the second inverter 20 (hereafter, referred to as a 'single inverter driving mode'). In the instant case, the controller 300 turns on the transfer switching unit 30. Accordingly, the windings are electrically connected to each other through the transfer switching unit 30, whereby Y-connection is configured and the motor is driven in the state in which only the first inverter 20 is driven. Because various techniques (Closed-End Winding (CES) for driving a motor by performing PWM control on one inverter are well-known in the art, a PWM control technique of an inverter which is performed in the single inverter driving mode is not described in more detail.

Meanwhile, when the output required for the motor is greater than the predetermined reference value, the controller 300 can drive the motor by driving both the first inverter 10 and the second inverter 20 (hereafter, referred to as a 'dual inverter driving mode'). In the instant case, the controller 300 turns off the transfer switching unit 30. Accordingly, the first ends of the windings of the motor are connected to the first inverter 10 and the second ends thereof are connected to the second inverter 20. That is, in the dual inverter driving mode, the motor becomes an open-end winding motor, in which both ends of the windings are open, and the two inverters 10 and 20 are driven by PWM control. Similarly, because various techniques (Open-End Winding (OEW) for driving a motor by performing PWM control on two inverters of which both ends are connected to windings of an open-end winding motor are well-known in the art, a PWM control technique of an inverter which is performed in the dual inverter driving mode is not described in more detail.

Meanwhile, the dual inverter driving mode is a mode in which a motor is driven as an open-end winding motor, and it has been known that it is possible to set the output of inverters about $\sqrt{3}$-time high, as compared with when a motor with windings connected in a Y-connection type is driven by only one inverter in the open-end winding driving. That is, when the open-end winding driving is applied, the number of turns of a motor can be increased $\sqrt{3}$ times, and accordingly, the current output for the same output of the motor can be reduced $\sqrt{3}$ times. Accordingly, the range of torque that can be output is also increased $\sqrt{3}$ time in the dual inverter driving mode.

FIG. 2 is a conceptual diagram of control by a motor driving system of the present disclosure.

Referring to FIG. 1, the motor driving system may include an audio video navigation (AVN) 100, a vehicle control unit (VCU) which is a control unit of a vehicle, a controller 300, a gate board that transmits signal from the controller to an inverter, and inverter 3-phase power modules 510 and 530.

A controller 300 according to various exemplary embodiments of the present disclosure can be implemented through a nonvolatile memory configured to store algorithms for controlling operation of various components of a vehicle or data about software commands for implementing the algorithms, and a processor configured to perform operation to be described below using the data stored in the memory. The memory and the processor may be individual chips. Alternatively, the memory and processor may be integrated into a single chip, and the processor may be one or more processors.

The AVN 100 can display information P about the driving mode of a vehicle, a breakage situation of an inverter, or the like. In detail, a driver may convert a single inverter driving mode or a dual inverter driving mode, when necessary, through the AVN 100. When the controller 300 diagnoses breakage of the inverter and the transfer switching unit 30 and determines that there is breakage, the controller 300 can inform a driver of the breakage situation of the inverter by displaying an inverter check message.

The VCU 200, which is an upper controller 300 of a vehicle, can control main operations of a vehicle. In detail, the VCU may determine and transmit a motor torque instruction considering available power of the battery, available motor torque, and a request from a driver (APS, BRAKE SW, SHIFT LEVER) to the controller 300. In the instant case, the VCU can exchange information such as a torque instruction according to driving mode information or inverter breakage information with the controller 300.

The controller 300 is a component that performs PWM control on the switching devices of the first inverter 10, the second inverter 20, and the transfer switching unit 300 so that the motor can be driven based on required output of the motor. In an exemplary embodiment of the present disclosure, the controller 300 can determine an inverter to be used to drive the motor based on the required output of the motor, correspondingly determine ON/OFF of the transfer switching unit 300, and perform PWM control on the switching devices of the determined inverter.

The controller 300 can determine whether the vehicle is currently driven in the single inverter driving mode (CES) or the dual inverter driving mode (OEW). This may be an inverter driving mode selected by a driver through the AVN 100 or may be an inverter driving mode in which the motor is driven in accordance with output required by a driver.

The controller 300 can diagnose breakage of the inverter and the transfer switching unit 30. The controller may include a component that can apply a breakage diagnosis signal of the inverter circuit and the transfer switching unit 30 or a component that performs a function corresponding to this, and can perform corresponding control when breakage occurs.

The controller 300 can generate an instruction of an inverter driving mode (CEW or OEW) to be changed or maintained based on current inverter driving mode of the vehicle and the breakage diagnosis result. Furthermore, the controller 300 applies a PWM control signal to the gate board in accordance with the generated inverter driving mode instruction. For example, when the vehicle is currently driven in the single inverter driving mode and the driver makes a selection to convert into the dual inverter driving mode through the AVN 100 or higher output is required for the motor, the controller 300 can generate an instruction for converting into the dual inverter driving mode. As an exemplary embodiment of the present disclosure, when the first inverter 10 and the second inverter 20 are normal but the transfer switching unit 300 breaks as the result of diagnosing breakage while the vehicle is driven in the single inverter driving mode, the controller 300 can generate an instruction for changing the driving mode of the motor into the dual inverter driving mode. This will be described below in more detail with reference to FIG. 3.

The gate board 400 can receive a PWM control signal according to the driving mode generated by the controller 300 and transmit the PWM signal to the inverter 3-phase power modules 510 and 530 as a gate signal R. In detail, the PWM control signal is transmitted only to the first inverter 3-phase power module 510 in the single inverter driving mode and the PWM control signal is transmitted to both the first inverter 3-phase power module 510 and the second inverter 3-phase power module 530 to drive the inverters.

FIG. 3 is a flowchart of a method of controlling a motor driving system according to various exemplary embodiments of the present disclosure.

Referring to FIG. 3, the controller 300 determines first whether the vehicle is currently driven in the single inverter driving mode (S100). When the vehicle is driven in the dual inverter driving mode, electricity is not applied to the transfer switching unit 30, so that the possibility of breakdown of the transfer switching unit 30 due to an overcurrent, etc. is very small. Furthermore, when the first inverter 10 and the second inverter 20 are both normal, there may be no problem with driving of the vehicle.

When the vehicle is driven in the single inverter driving mode, breakdown diagnosis is performed on the first inverter 10, the second inverter 20, and the transfer switching unit 30. In the instant case, the controller 300, as a Micro Computer Unit (MCU), can check whether there is breakdown by continuously transmitting a breakdown diagnosis signal while the vehicle is driven.

The controller 300 determines whether the first inverter 10 and the second inverter 20 are normal but the transfer switching unit 30 is broken, as the result of performing breakdown diagnosis (S300). The breakdown may be a signal of breakdown or an error that the MCU can find out, and may not be physical breakdown of the switching devices. Accordingly, when there is breakdown, the controller 300 can prevent the breakdown results in physical breakdown by rapidly taking appropriate measures.

When only the transfer switching unit breaks, the controller 300 determines whether the transfer switching unit 30 is off. When the transfer switching unit 30 is not off, the controller 300 can forcibly turn off the transfer switching unit 30 (S500). The transfer switching unit 30 has a total of three switching devices of one for each phase for the topology, and when the switching device for even one phase shows a break reaction through breakdown diagnosis such as diagnosis of an overcurrent, normal CES operation cannot be achieved by only the other switching devices for two phases. Accordingly, in the instant case, the entire transfer switching unit 30 is turned off by forcibly turning off the other switching devices for two phases. When the entire transfer switching unit 30 is turned off due to breakdown, it may not be specifically forcibly turned off.

When the transfer switching unit 30 is turned off, the controller 300 converts the single inverter driving mode into the dual inverter driving mode (S600). In more detail, the controller 300 generates an instruction for the dual inverter driving mode and outputs and transmits a corresponding PWM control signal to the gate board 400. The gate board 400 can transmit the received signal for the dual inverter driving mode to the first inverter 10 and the second inverter 20.

In the instant case, the controller 300 applies the torque limitation range based on voltage/speed of the single inverter driving mode to the dual inverter driving mode (S700). In more detail, the controller 300 may set torque limitation ranges as controllable torque ranges and may apply different torque limitation ranges to the singe inverter driving mode and the dual inverter driving mode. Theoretically, in the dual inverter driving mode, a high controllable torque limit is applied in comparison to the single inverter driving mode, and accordingly, the torque limitation range is also limited to a higher value. For example, when the magnitude of output torque depends on the degree of depression of an accelerator pedal, larger power is instantaneously output in the dual inverter driving mode even though the accelerator pedal is depressed in the same amount. Accordingly, when the driving mode is converted into the dual inverter driving mode due to breakdown of the transfer switching unit 30 while the vehicle is driven, if the torque limitation range which is correspondingly applied is changed, the driving situation may be rapidly changed. That is, there is a high possibility of an accident if the vehicle was being driven at a high speed. Accordingly, the controller 300 applies the torque limitation range of the single inverter driving mode that has been applied, when converting the driving mode into the dual inverter driving mode due to a breakdown reaction of the transfer switching unit 30.

As converting into the dual inverter driving mode, the controller 300 drives the second inverter 20 (S800). In more detail, the controller 300 drives the second inverter 20 by applying a PWM control signal to the second inverter 20. In the instant case, as described above, as the second inverter 20 is driven, the motor becomes an open-end winding motor in which both ends of the windings are open, and PWM control is performed on the first inverter 10 and the second inverter 20 connected to both ends of the windings, respectively, whereby the motor is operated in the dual inverter driving mode.

Meanwhile, the controller 300 can display an inverter check request message to the driver (900). The present message is displayed through the AVN 100 and informs the driver of an inverter breakdown situation to induce the driver to rapidly have an inspection of the inverters, whereby the user may be protected.

FIG. 4 and FIG. 5 are a graph and a table showing torque limitation ranges of inverter driving modes according to various exemplary embodiments of the present disclosure.

The maximum torque that the motor driving system can linearly control depends on a speed and the magnitude of a DC voltage which is applied to the inverters. Accordingly, the torque range for speed/voltage which may be applied to each inverter driving mode is limited. For example, a specific output torque instruction is input, a current instruction is formed on an iso-torque curve within the torque limitation ranges that are applied to the inverter driving modes, respectively. As an exemplary embodiment of the present disclosure, the magnitudes of the iso-torque curves are T1>T2>T3>T4 in FIG. 4 and FIG. 5.

FIG. 4 is a graph and table showing a torque limitation range in a dual inverter driving mode according to various exemplary embodiments of the present disclosure. Referring to FIG. 4, a torque limitation range A1 in the dual inverter driving mode is shown in a current instruction graph. The torque limitation range may be shown in the torque limitation table for speed/voltage A2.

FIG. 5 is a graph and table showing a torque limitation range in a single inverter driving mode according to various exemplary embodiments of the present disclosure. Referring to FIG. 5, a torque limitation range A1 in the single inverter driving mode is shown in a current instruction graph. The torque limitation range may be shown in the torque limitation table for speed/voltage B2.

For example, when the magnitude of speed is w2 and the magnitude of voltage V2, the output torque is T2 in the dual inverter driving mode and may be shown as a point A3 in the current instruction graph. However, in the single inverter driving mode, the output torque is T3 and may be shown as a point B3 in the current instruction graph, as shown in FIG. 5. That is, even though the same speed and voltage are applied, larger torque is output in the dual inverter driving mode. Accordingly, as described above, when the driving mode is converted into the dual inverter driving mode due to breakdown of the transfer switching unit 30 while the vehicle is driven, and when the corresponding torque limitation range is also changed, larger torque is output and the driving situation can be rapidly changed even though the accelerator pedal is depressed in the same amount. Therefore, according to an exemplary embodiment of the present disclosure, when the driving mode is converted into the dual inverter driving mode due to breakdown, the torque limitation range of the single inverter driving mode which has been being applied is intactly applied.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving system comprising:
 a first inverter including a plurality of switching devices and connected to first ends of windings of a motor;

a second inverter including a plurality of switching devices and connected to second ends of the windings of the motor;

a transfer switching unit including a plurality of switching devices of which first ends are connected to the windings of the motor, respectively, and of which second ends are connected to each other between the first inverter and the second inverter; and a controller configured to control the transfer switching unit to drive the motor in accordance with a single inverter driving mode that utilizes the first inverter and a dual inverter driving mode that utilizes the first inverter and the second inverter, and configured to turn off the transfer switching unit and drive the second inverter to convert a driving mode of the motor into the dual inverter driving mode when the transfer switching unit breaks down in the single inverter driving mode;

wherein the controller is configured to operate the motor in a Y-connection by turning on the transfer switching unit in the single inverter driving mode, and to operate the motor in open-end winding by turning off the transfer switching unit in the dual inverter driving mode.

2. The motor driving system of claim 1, wherein the controller is configured to set torque limitation ranges as ranges of controllable torque, and to apply different torque limitation ranges to the singe inverter driving mode and the dual inverter driving mode.

3. The motor driving system of claim 2, wherein the controller is configured to maintain the torque limitation range of the single inverter driving mode when converting the single inverter driving mode into the dual inverter driving mode due to the breakdown of the transfer switching unit.

4. The motor driving system of claim 1, wherein the controller is configured to diagnose breakdown of the first inverter and the second inverter, and to convert the driving mode of the motor into the dual inverter driving mode when the transfer switching unit breaks down even though the first inverter and the second inverter are normal.

5. The motor driving system of claim 1, wherein the controller is configured to output an inverter check request message when the transfer switching unit breaks down.

6. The motor driving system of claim 1, wherein the switching devices of the transfer switching unit are mechanical relays.

7. The motor driving system of claim 1, wherein the controller is configured to forcibly turn off the transfer switching unit when even any one of the switching devices of the transfer switching unit breaks down.

8. The motor driving system of claim 1, wherein the controller is configured to convert the driving mode of the motor into the dual inverter driving mode without turning off the transfer switching unit when all of the switching devices of the transfer switching unit are off due to breakdown of the transfer switching unit.

9. A method of controlling a motor driving system that includes a first inverter, a second inverter, and a transfer switching unit and operates a motor into a single inverter driving mode that utilizes the first inverter or into a dual inverter driving mode that utilizes the first inverter and the second inverter, the method comprising:

determining, by a controller, whether a vehicle is driven in the single inverter driving mode;

diagnosing, by the controller, breakdown of the transfer switching unit;

turning off, by the controller, the transfer switching unit when the transfer switching unit breaks down; and converting, by the controller, a driving mode of the motor into the dual inverter driving mode when the transfer switching unit is off;

wherein the controller is configured to operate the motor in a Y-connection by turning on the transfer switching unit in the single inverter driving mode, and to operate the motor in open-end winding by turning off the transfer switching unit in the dual inverter driving mode.

10. The method of claim 9, further including:

setting, by the controller, torque limitation ranges as ranges of controllable torque, and applying, by the controller, different torque limitation ranges to the single inverter driving mode and the dual inverter driving mode.

11. The method of claim 10, wherein the controller is configured to maintain the torque limitation range of the single inverter driving mode when converting the single inverter driving mode into the dual inverter driving mode due to the breakdown of the transfer switching unit in the applying of the torque limitation ranges.

12. The method of claim 9, wherein the controller is configured to diagnose breakdown of the first inverter and the second inverter in the diagnosing of the breakdown of the transfer switching unit, and to convert the driving mode of the motor into the dual inverter driving mode when the first inverter and the second inverter are normal and the transfer switching unit breaks down.

13. The method of claim 9, further including:

outputting, by the controller, an inverter check request message when the transfer switching unit breaks down.

14. The method of claim 9, wherein the controller is configured to forcibly turn off the transfer switching unit when even any one of the switching devices of the transfer switching unit breaks down in the turning off of the transfer switching unit.

15. The method of claim 9, wherein the switching devices of the transfer switching unit are mechanical relays.

16. The method of claim 9, wherein the controller is configured to convert the driving mode of the motor into the dual inverter driving mode without turning off the transfer switching unit when all of the switching devices of the transfer switching unit are off due to the breakdown of the transfer switching unit.

17. A non-transitory computer readable storage medium on which a program for performing the method of claim 9 is recorded.

* * * * *